US007397055B2

(12) United States Patent
Barker et al.

(10) Patent No.: US 7,397,055 B2
(45) Date of Patent: Jul. 8, 2008

(54) SMITH-PURCELL RADIATION SOURCE USING NEGATIVE-INDEX METAMATERIAL (NIM)

(75) Inventors: Delmar L. Barker, Tucson, AZ (US); William R. Owens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 376 days.

(21) Appl. No.: 11/120,451

(22) Filed: May 2, 2005

(65) Prior Publication Data

US 2006/0243925 A1      Nov. 2, 2006

(51) Int. Cl.
*H05G 2/00*      (2006.01)
(52) U.S. Cl. .................................. 250/504 R; 250/493.1
(58) Field of Classification Search .................. 250/399, 250/504 R, 493.1
See application file for complete search history.

(56) References Cited

U.S. PATENT DOCUMENTS 5,268,693 A      12/1993    Walsh et al.
6,965,625 B2 *   11/2005    Mross et al. ................... 372/74

OTHER PUBLICATIONS

Andrews, H.L. et al.: "Gain of a Smith-Purcell free-electron laser" Phys. Rev. STAB, vol. 7, No. 7, Jul. 2004.*
Yamamoto, K. et al.: "Observation of a resonant light emision from an electron beam exciting a photonic band" proceedings from PECS-IV conference, Oct. 28-31, 2002.*
Lu, J. et al: "Cerenkov radiation in materials with negative permittivity and permeability," Optics Express, vol. 11, No. 7, Apr. 7, 2003.*
Andrews, H L et al: "Gain of a Smith-Purchell free-electron laser" Physical Review Special Topics-Accelerators and Beams APS USA, vol. 7, No. 7, Jul. 2004.
Smith D R et al: "Enhances Diffraction From a Grating on the Surface of a Negative-Index Metamaterial" Physical Review Letters APS USA, vol. 93, No. 13. Sep. 24, 2004.
(Sep. 24, 2004) pp. 137405/1-4 XP002399215 ISSN: 0031-9007 cited in the whole whole document.
Yamaguti S et al "Photonic crystals versus diffraction gratings in Smith-Purcell radiation" Physical Review B (Condensed Matter and Materials Physics) APS Through AIP USA.
vol. 66 No. 19, Nov. 15, 2002 pp. 195202-1 XP 002399216, ISSN: 0163-1829 cited in the application abstract.
Urata J. et al: "Superradiant Smith-Purcell emission" Physical Review Letters, New York, NY, US. vol. 80, No. 3 Jan. 19, 1998 pp. 516-519 XP002277686.

(Continued)

*Primary Examiner*—Jack I. Berman
*Assistant Examiner*—Michael Maskell
(74) *Attorney, Agent, or Firm*—Noblitt & Gilmore, LLC (57) ABSTRACT

The Smith Purcell effect, in which a beam of electrons passes close to a conducting grating and induces electromagnetic radiation from the grating surface, can be used as a source of THz radiation. A grating composed of negative index metamaterial (NIM) enhances the output of the Smith Purcell source. Of particular interest is the use of a NIM grating in a Smith-Purcell source to provide a tunable coherent CW source of terahertz (THz) radiation.

19 Claims, 7 Drawing Sheets

OTHER PUBLICATIONS

ISSN: 0031-9007 cited in the application, figure 1.

Urata, J., et al., "Superradiant Smith Purcell Emission", PRL 80#3, Jan. 1998.

Yamaguti et al., "Photonic crystals versus diffraction gratings in Smith-Purcell radiation", Physical Review B 66, 195202 (2002).

J. B. Pendry, Phys. Rev. Lett. 85, 3966 (2000).

D. R. Smith et al. (Physical Review Letters, vol. 93, No. 13, Sep. 24, 2004).

J. B. Pendry, A. J. Holden, W. J. Stewart, I. Youngs, Phys. Rev. Lett. 76, 4773 (1996).

J. B. Pendry, A. J. Holden, D. J. Robbins, W. J. Stewart, "Magnetism from conductors and enhanced non-linear phenomena." IEEE Trans. MTT, 47, 2075 (1999).

* cited by examiner (PRIOR ART)
FIG. 1

SMITH-PURCELL RADIATION SOURCE USING NEGATIVE-INDEX METAMATERIAL (NIM)

BACKGROUND OF THE INVENTION

1. Field of the Invention

This invention relates to electromagnetic radiation sources, and more specifically to radiation sources based on the Smith-Purcell effect with particular application in the THz regions of the spectrum.

2. Description of the Related Art

THz-frequency radiation, in the frequency region from 0.3 THz to 10 THz, has been relatively unexploited compared to the adjacent radio frequency (RF) and IR spectral bands that lie on either side of it. This is largely because of transmission difficulties due to absorption by atmospheric water vapor but also due to a lack of practical radiation sources and detectors. In recent years there has been a significant growth of interest in applications of this previously underutilized portion of the electromagnetic spectrum in the areas of active short range imaging systems, space-based communications, imaging, and spectroscopy.

Figure 1:
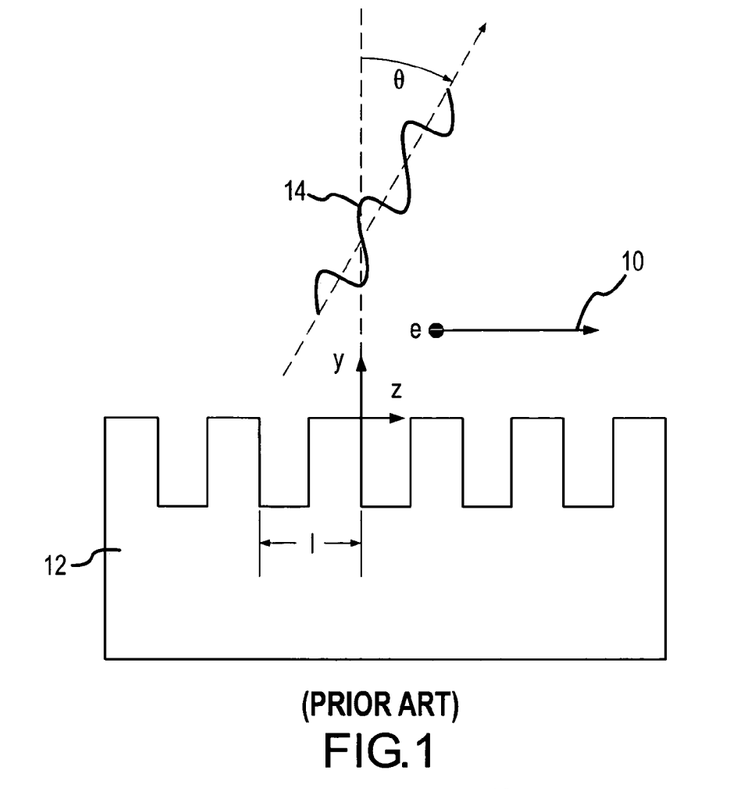
FIG. 1, as described above, is a diagram illustrating the Smith-Purcell effect.
Figure 2:
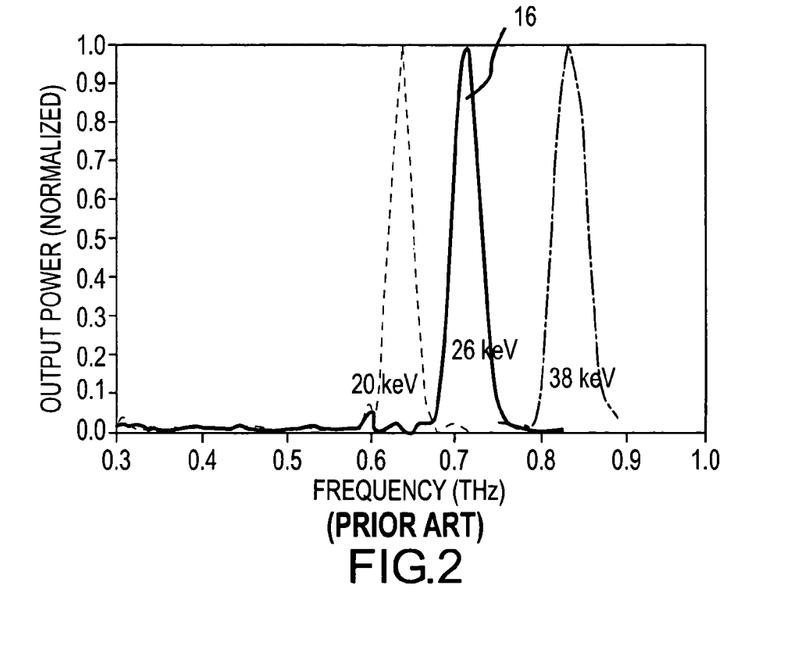
FIG. 2, as described above, is a diagram illustrating tunability of Smith-Purcell radiation.

Prior work by Urata et al. of Dartmouth College (Urata, J., et al., "Superradiant Smith Purcell Emission", PRL 80#3, January 1998), which is hereby incorporated by reference, has established that the classic Smith Purcell effect can be used as a source of radiation in the far infrared (FIR) to terahertz (THz) spectral regions. As illustrated in FIG. 1, the beam 10 from an electron microscope is focused over a properly sized metal diffraction grating 12 thereby producing electromagnetic radiation 14. The wavelength of the radiation is determined from the expression $$\lambda = \frac{l}{|n|}\left(\frac{1}{\beta} - \sin\theta\right)$$

where l is the grating period, $\beta \equiv v/c$ is the electron velocity v relative to the speed of light c, $\theta$ is the angle of emission measured from a direction normal to the surface of the grating, and n is the spectral order. Urata et al. conclude "extensions of this technique promise a new tunable coherent CW source for the difficult to access . . . 30-1000 micron range of the spectrum". As shown in FIG. 2, limited tunability of the emission spectrum 16 can be achieved by varying the voltage, hence velocity of the electron beam. Vermont Photonics (in collaboration with a Dartmouth group) has recently developed a source of THz radiation using this technique.

Subsequent work by Yamaguti et al. (Yamaguti et al., "Photonic crystals versus diffraction gratings in Smith-Purcell radiation", Physical Review B 66, 195202 (2002)) demonstrated that the use of a two-dimensional photonic crystal in place of the one-dimensional diffraction grating created resonant structures of enhanced intensity whose peak heights were an order of magnitude larger than the emission intensity of the one dimensional Bragg diffraction grating. Yamaguti et al. conclude "the results of calculations thus show a possible advantage of photonic crystals over diffraction gratings as converter of the evanescent field from a running charge into propagating waves."

Although Smith-Purcell sources hold great promise for THz sources, further advancements are needed to increase their intensity and efficiency to a point where commercialization is practicable.

SUMMARY OF THE INVENTION

The present invention provides a high intensity Smith-Purcell radiation source with particular applicability in the THz regions of the spectrum.

This is accomplished with a periodic array of interface discontinuities formed between first and second media having index of refraction of opposite sign in a specified bandwidth. A charged particle beam is directed across the periodic array thereby producing enhanced Smith-Purcell electromagnetic radiation in the specified bandwidth. The reflection and transmission coefficients for the evanescent waves generated at the interface between a positive and a negative-index medium have far greater magnitude than those generated at the surface between two media of the same index sign as is the case in known Smith-Purcell radiation sources. In a perturbative sense, the grating modulation leads to a coupling between the incident beam and all diffractive beams, mediated by the evanescent components of the surface waves. As a result, the intensity of the radiation emitted by the Smith-Purcell radiation source is much enhanced.

In one embodiment, a 1, 2 or 3-dimensional grating (planar, wedge or other) is formed from a Negative-Index Metamaterial (NIM). The positive-index media may be a vacuum environment (n=1) or even material (n>1) selectively placed on the grating at the interface discontinuities to further enhance radiation. The NIM has a resonant structure that may be defined by a periodic array of split-ring resonators and rod structures, a patterned photonic crystal or other man made structures that exhibit a negative index of refraction over the specified bandwidth. The resonant structure may also be configured in 1, 2 or 3 dimensions. To achieve the enhanced intensity, the resonant wavelength the grating must lie within the resonant bandwidth of the NIM material where the index is negative.

In another embodiment, a THz radiation source directs an electron beam across the surface of a grating formed from a NIM. The bandwidth of the resonant structure in the NIM is matched to the resonance of the grating in a specified THz bandwidth.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a high intensity Smith-Purcell radiation source with particular applicability in the THz regions of the spectrum, specifically $0.3 \times 10^{12}$ Hz to $10 \times 10^{12}$ Hz.

Figure 3:
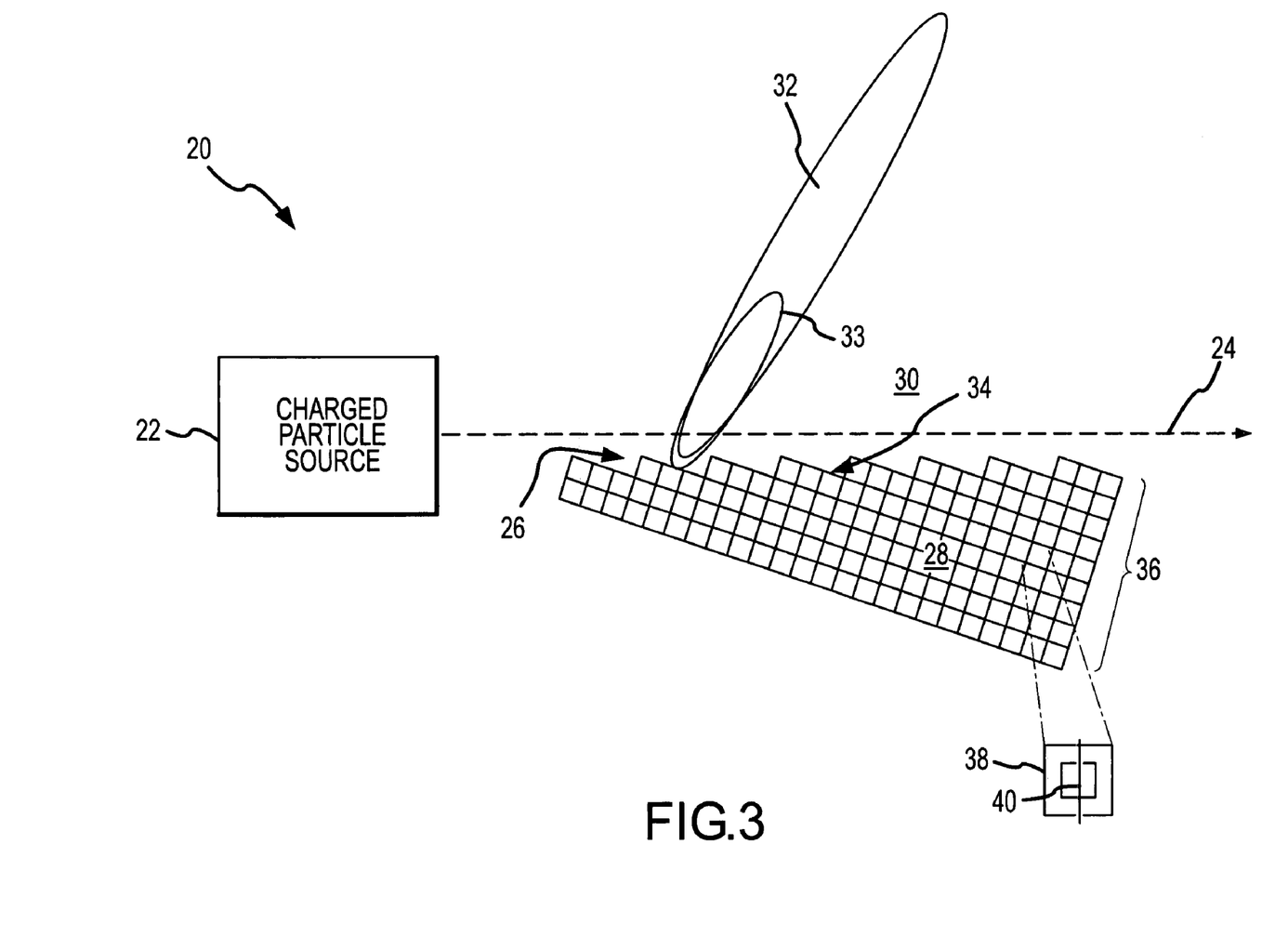
FIG. 3 is a diagram of a Smith-Purcell radiation source using Negative-Index Metamaterial (NIM) in accordance with the present invention.

As shown in FIG. 3, a Smith-Purcell radiation source 20 includes a source 22 that directs a charged particle beam 24 across a periodic array of interface discontinuities 26 formed between first and second media 28 and 30, respectively, having index of refraction of opposite sign in a specified bandwidth. The interaction of the charged particle beam 24 with electrons in at least one of the media at the interface discontinuities thereby produces enhanced Smith-Purcell electromagnetic radiation 32 in the specified bandwidth. The reflection and transmission coefficients for the evanescent waves generated at the interface between the positive and a negative-index medium have far greater magnitude than those generated at the surface between two media of the same index sign as is the case in known Smith-Purcell radiation sources. In a perturbative sense, the interface discontinuities lead to a coupling between the incident beam and all diffractive beams, mediated by the evanescent components. As a result, the radiation 32 is at least several times greater than the radiation 33 emitted from a conventional grating formed from a material having a positive index of refraction. Limited tunability of the emission spectrum can be achieved by varying the voltage, hence velocity of the charged particle beam 24.

In this particular embodiment, the periodic array of interface discontinuities 26 and the first media 28 are a grating 34 formed of a Negative-Index Metamaterial (NIM). This particular grating is a one-dimensional wedge. Alternately, a planar-grating or two and three-dimensional gratings formed of a NIM can be used. Multi-dimensional gratings may take the form of sandwiched gratings, annular cylinders, spheres etc. The second media 30 is a vacuum environment in which the refractive index is, by definition, equal to plus one.

A metamaterial is a composite or structured material that exhibits properties not found in naturally occurring materials or compounds. Negative-index metamaterials have specific electromagnetic properties, namely that the magnetic permeability $\mu$ and electric permittivity $\epsilon$ are negative over a specified bandwidth, and thus the index of refraction n is negative over the specified bandwidth. The NIM 28 has a resonant structure 36 that may, for example be defined by a periodic array of split-ring resonators 38 and rod structures 40, a patterned photonic crystal or other man made structures that exhibit a negative index of refraction over the specified bandwidth. The resonant structure stores energy so that more energy is coupled out of the grating. The theory of negative-index metamaterials was first described in V. G. Veselago, Soviet Physics USPEKHI, 10, 509 (1968) and later reintroduced by J. B. Pendry, Phys. Rev. Lett. 85, 3966 (2000), which are hereby incorporated by reference.

Figure 4:
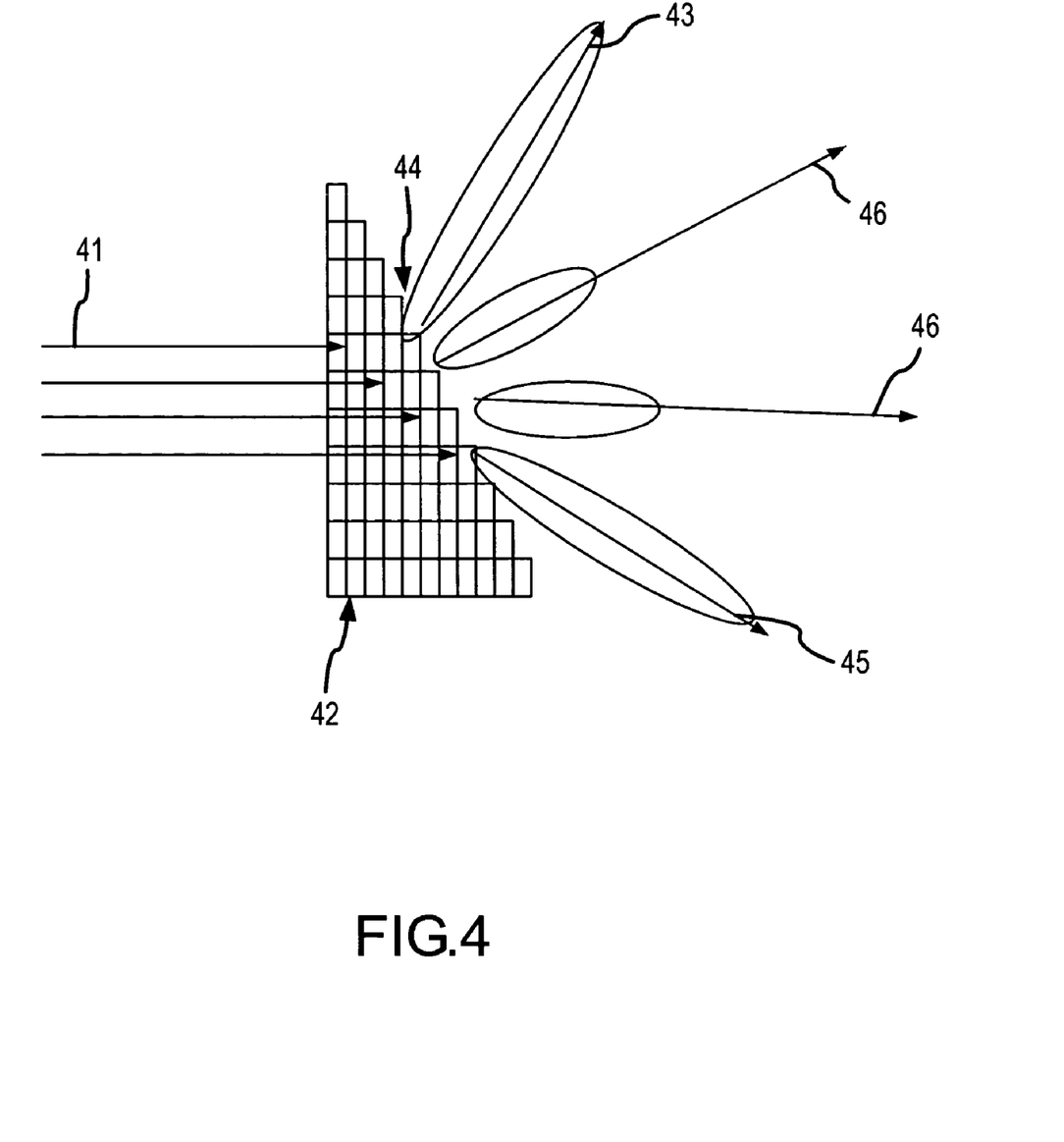
FIG. 4 is a diagram of a known refraction experiment with a NIM grating.

Enhanced diffraction from a grating on the surface of a Negative-Index Metamaterial was just recently discovered by D. R. Smith et al. (Physical Review Letters, Vol. 93, Number 13, Sep. 24, 2004). Smith et al. passed an electromagnetic wave 41 through a wedge 42 formed of NIM in order to study the effects of NIM on the refracted beam 43 as illustrated in FIG. 4. The finite unit-cell size of the NIM led to an unavoidable stepping of the surface to achieve the desired angle for the refractive surface. The surface stepping constitutes a grating 44, which would be expected to generate a first-order diffracted beam 45 in addition to the zeroth order refracted beam 43. What they found was that the coupling to the first 45 and higher order diffracted beams 46 is much larger than would be the case for a positive index material.

Figure 5:
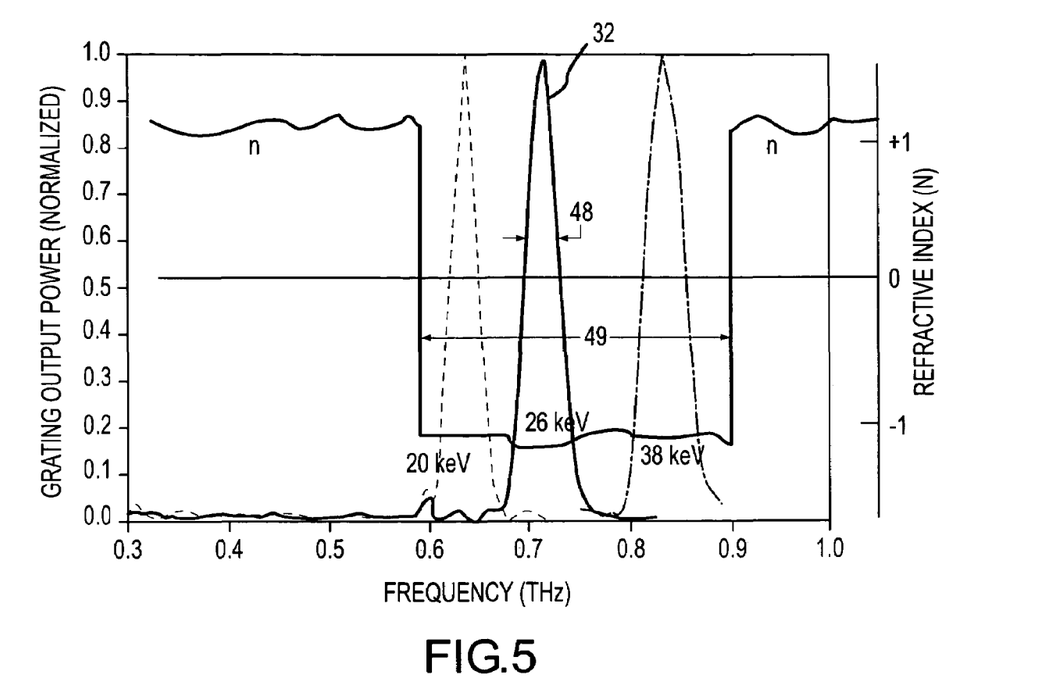
FIG. 5 is a plot illustrating the overlapping resonances of the periodic array and NIM.

By combining the enhanced coupling of the diffraction beam in a NIM grating with the Smith-Purcell effect, we have constructed a high-intensity radiation source with particular applicability as a source of THz radiation. To achieve the enhanced electromagnetic radiation 32, the resonant wavelength 48 of the grating must lie within the resonant bandwidth 49 of the NIM material where the refractive index is negative ($n(\omega)<1$ for $\omega_1<\omega<\omega_2$) as shown in FIG. 5. The resonant wavelength 48 of the grating is determined by the size and spacing of the individual surface step elements and the observer angle with respect to the surface. The resonant bandwidth 49 of the NIM material is determined by dimensions of the metamaterial building blocks or unit cells. Outside this bandwidth the NIM has a positive-index of refraction and thus does not enhance the radiation at those wavelengths. Because of the lack of availability of high-power cost-effective THz sources, the THz bandwidths are of particular importance.

Figure 6:
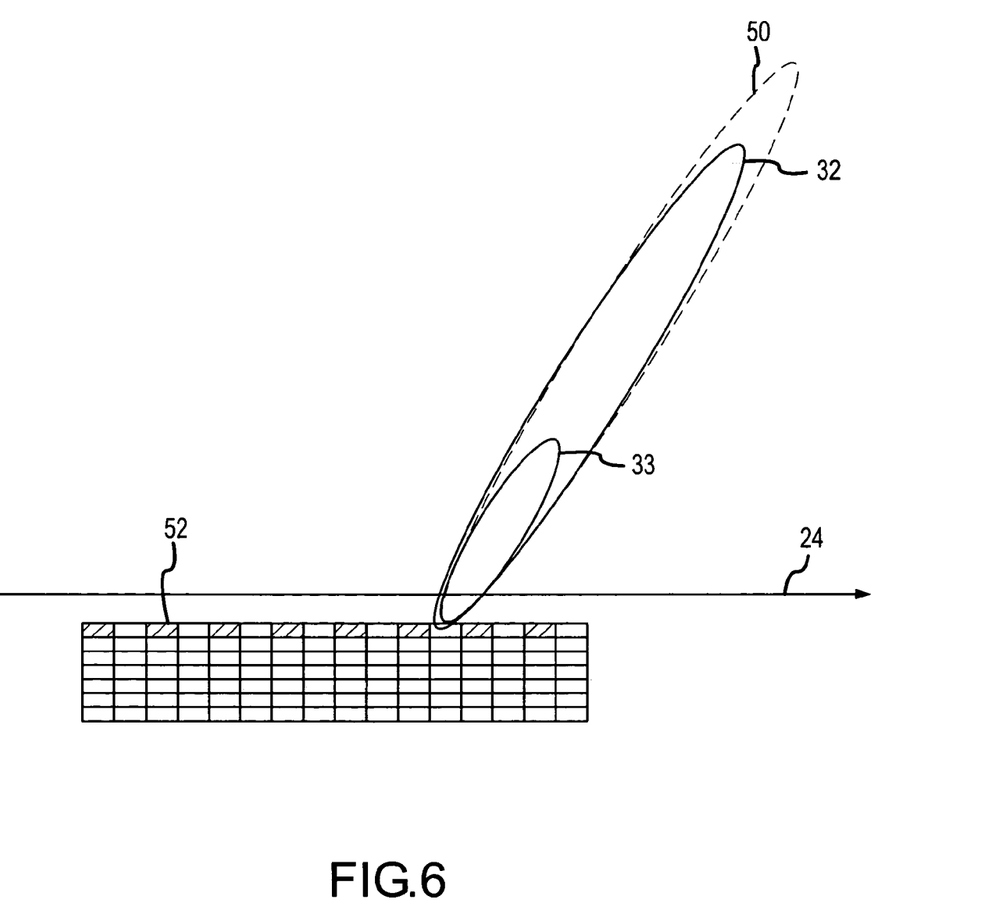
FIG. 6 is a diagram of an alternate embodiment of the Smith-Purcell radiation source.

As shown in FIG. 6, Smith-Purcell radiation 50 from a grating formed of a NIM may be further enhanced by selectively placing positive-index material 52 (n>1) at the interface discontinuities. The effect of having material where n>1 instead of a vacuum where n=1 at the interface is to provide increased coupling between the evanescent components and the radiated wave.

Figure 7:
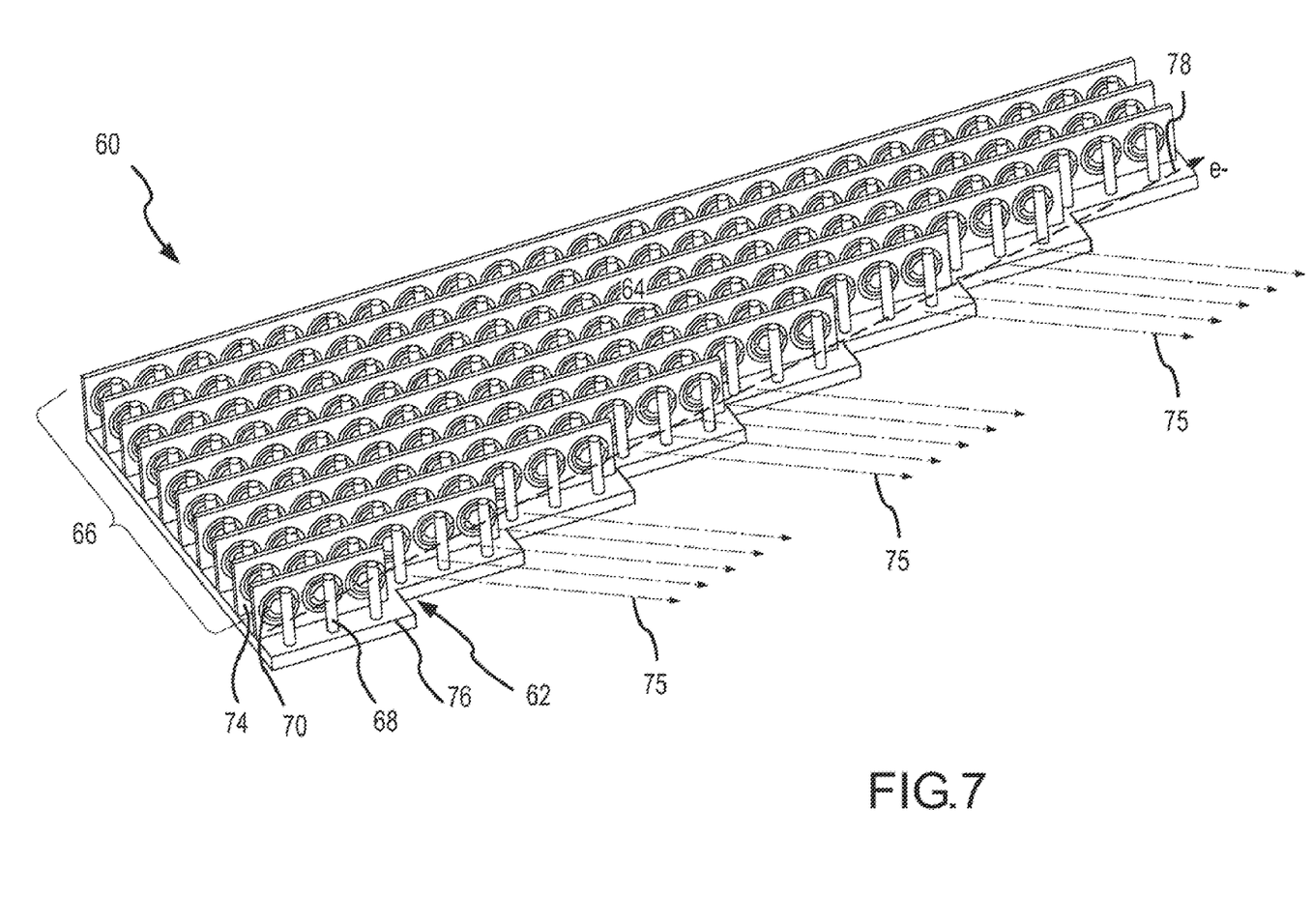
FIGS. 7 and 8 are diagrams of one and two-dimensional resonant structures for a NIM grating.

An exemplary embodiment of a Smith-Purcell THz radiation source 60 including a one-dimensional wedge grating 62 formed from a NIM 64 having a resonant structure defined by a periodic array 66 of metal posts 68 and split-ring resonators 70 is depicted in FIG. 7. The split-ring resonators 70 are patterned on an insulating substrate 74 and mounted with the metal posts 68 on a substrate 76 in electrical isolation from each other. J. B. Pendry, A. J. Holden, W. J. Stewart, I. Youngs, *Phys. Rev. Lett.* 76, 4773 (1996) suggested that an array of conducting wires could respond to the electrical component of incident radiation, displaying a negative permittivity. J. B. Pendry, A. J. Holden, D. J. Robbins, W. J. Stewart, "Magnetism from conductors and enhanced non-linear phenomena," *IEEE Trans. MTT*, 47, 2075 (1999) suggested that an array of ring resonators could respond to the magnetic component of incident radiation, displaying an effective permeability. By arranging the split-ring resonators 70 into a strongly interacting array, a bandwidth of negative permeability is created. Combining the two as shown in FIG. 7 creates a NIM with a negative refractive $n(\omega)<1$ for $\omega_1<\omega<\omega_2$ index in a specific bandwidth. This particular resonant structure for a NIM is well known in the literature and has been tested to demonstrate, among other properties, the reversal of Snell's law, reversed Doppler shift and reversed Cerenkov radiation.

A source directs a charged particle beam 78, suitably electrons, across the grating 64 thereby stimulating resonances in the electric and magnetic elements of the negative index metamaterial. In a manner similar to surface plasmons in a traditional conducting PIM grating in the Smith Purcell effect, these resonances couple to electromagnetic fields outside the grating and result in propagation of electromagnetic waves 75 away from the surface. The coupling of the NIM element resonant fields to the external medium is much stronger that that produced by surface plasmons in the PIM grating, resulting in an enhanced radiated power compared to a standard Smith Purcell source.

Figure 8:
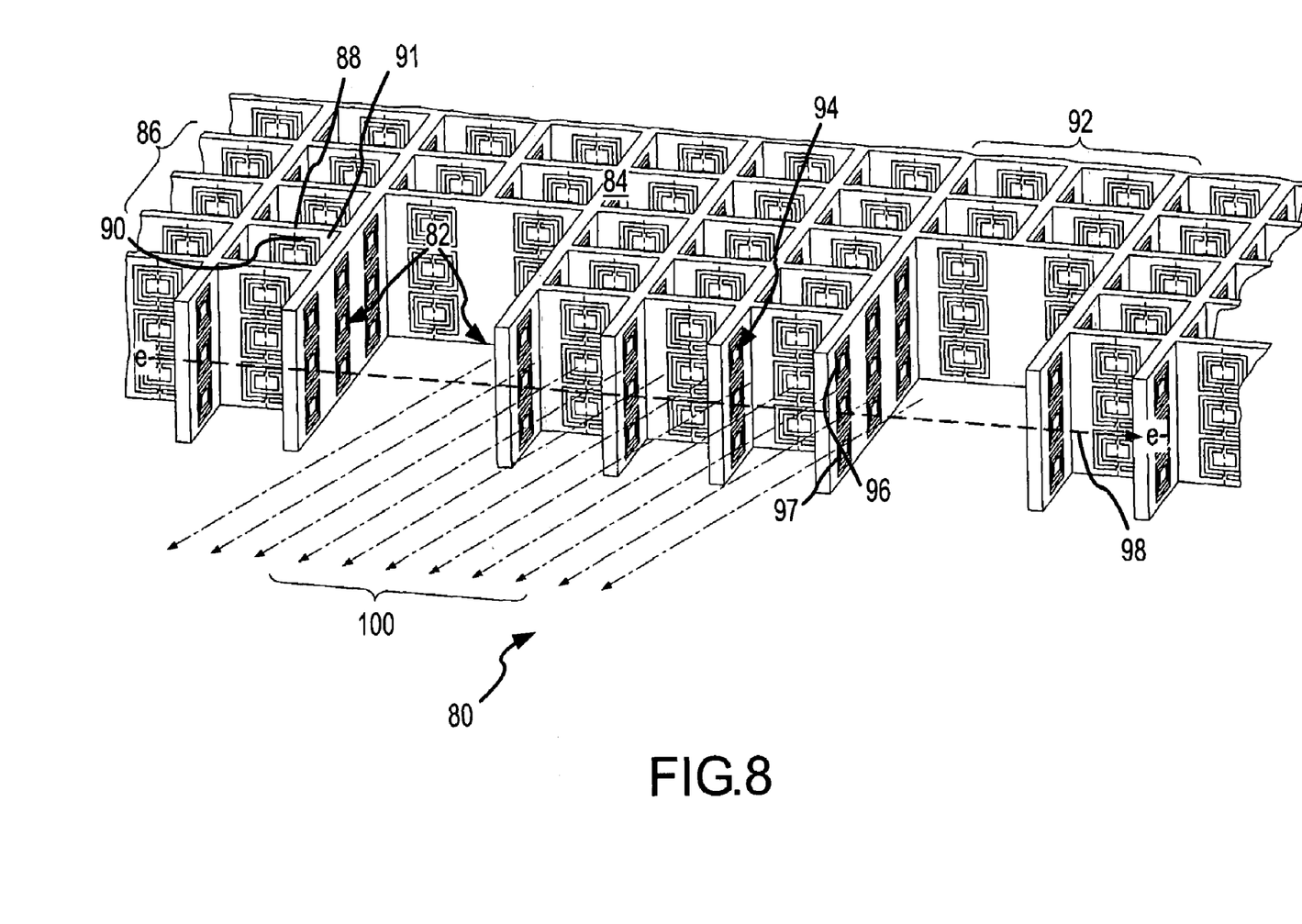

An exemplary embodiment of a Smith-Purcell THz radiation source 80 including a one-dimensional flat grating 82 formed from a NIM 84 having a two-dimensional resonant structure defined by a first periodic array 86 of metal posts 88 and split-ring resonators 90 formed on opposite sides of an insulator 91 and a second periodic array 92 of metal posts 94 and split-ring resonators 96 formed on opposite sides of an insulator 97 is depicted in FIG. 8. The two-dimensional resonant structure is very similar to the one-dimensional structure illustrated in FIG. 7 except that it includes a second periodic array 92 perpendicular to the first. Furthermore, a three-dimensional resonant structure may be created by including a third periodic array that is perpendicular to the first two (a horizontal plane in FIG. 8). Multi-dimensional resonant structures may be more efficient at coupling energy from the input beam 98 into the sourced electromagnetic radiation 100 because they contain more resonant elements per unit volume, although their orientation is not optimal. Furthermore, in the multi-dimensional resonant structures the charged particle beam can be directed across the grating from multiple directions. This permits radiation in several orthogonal directions from the same sample.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A radiation source, comprising:
   a periodic array of interface discontinuities formed between first and second media having index of refraction of opposite sign in a specified bandwidth; and
   a source that directs a charged particle beam across the periodic array thereby producing enhanced Smith-Purcell electromagnetic radiation in the specified bandwidth.

2. The radiation source of claim 1, wherein the specified bandwidth is specifically $0.3 \times 10^{12}$ Hz to $10 \times 10^{12}$ Hz.

3. The radiation source of claim 1, wherein said source modulates the voltage of the charged particle beam to vary the wavelength of the electromagnetic radiation within the specified bandwidth.

4. The radiation source of claim 1, wherein said charged particle beam is an electron beam.

5. The radiation source of claim 1, wherein said first media is a Negative-Index Metamaterial (NIM) having a grating formed therein.

6. The radiation source of claim 5, wherein a resonant wavelength of the grating lies within a resonant bandwidth of the NIM.

7. A radiation source, comprising:
   a periodic array of interface discontinuities formed between first and second media having index of refraction of opposite sign in a specified bandwidth, said first media being a Negative-Index Metamaterial (NIM) having a grating formed therein;
   a third media having a positive index of refraction greater than one that is spaced along the grating; and
   a source that directs a charged particle beam across the periodic array thereby producing enhanced Smith-Purcell electromagnetic radiation in the specified bandwidth.

8. The radiation source of claim 5, wherein the NIM has a multidimensional resonant structure.

9. A radiation source, comprising:
   a grating formed of a Negative-Index Metamaterial (NIM) in which the material's index of refraction is negative over a resonant bandwidth, and
   a source that directs a charged particle beam across the grating producing electromagnetic radiation at a resonant wavelength within the resonant bandwidth.

10. The radiation source of claim 9, wherein the specified bandwidth is specifically $0.3 \times 10^{12}$ Hz to $10 \times 10^{12}$ Hz.

11. The radiation source of claim 9, wherein said source modulates the voltage of the charged particle beam to vary the wavelength of the electromagnetic radiation within the specified bandwidth.

12. A radiation source comprising:
    a grating formed of a Negative-Index Metamaterial (NIM) in which the material's index of refraction is negative over a resonant bandwidth,
    a material having a positive index of refraction greater than one that is spaced along the grating, and
    a source that directs a charged particle beam across the grating producing electromagnetic radiation at a resonant wavelength within the resonant bandwidth.

13. The radiation source of claim 9, wherein the NIM has a multidimensional resonant structure.

14. A method of generating electromagnetic radiation comprising directing a charged particle beam across a grating formed of a Negative-Index Metamaterial (NIM).

15. The method of claim 14, wherein the NIM has a negative refractive index within a resonant bandwidth, said electromagnetic radiation being generated at a resonant wavelength of the grating within said resonant bandwidth.

16. The method of claim 14, wherein the electromagnetic radiation is generated at frequencies of $0.3 \times 10^{12}$ Hz to $10 \times 10^{12}$ Hz.

17. The method of claim 14, further comprising modulating the voltage of the charged particle beam to vary the wavelength of the electromagnetic radiation.

18. A method of generating electromagnetic radiation comprising directing a charged particle beam across a grating formed of a Negative-Index Metamaterial (NIM) with a material having a positive index of refraction greater than one spaced along the grating.

19. The method of claim 14, wherein the NIM has a multidimensional resonant structure.

* * * * *